(12) United States Patent
Morihara et al.

(10) Patent No.: US 9,719,040 B2
(45) Date of Patent: Aug. 1, 2017

(54) METHOD AND PROCESS FOR PRODUCING A WATER-RESISTANT, MECHANICALLY STABLE FORM OF TORREFIED BIOMASS

(71) Applicant: HM3 ENERGY, INC., Gresham, OR (US)

(72) Inventors: Hiroshi Morihara, Gresham, OR (US); William C. Breneman, Moses Lake, WA (US); Dave Carter, Brush Prairie, WA (US); Andrew J. Green, Salem, OR (US); Howard J. Dawson, Anacortes, WA (US)

(73) Assignee: HM³ ENERGY, INC., Gresham, OR (US)

( * ) Notice: Subject to any disclaimer, the term of this patent is extended or adjusted under 35 U.S.C. 154(b) by 0 days.

(21) Appl. No.: 14/648,531

(22) PCT Filed: Nov. 29, 2013

(86) PCT No.: PCT/US2013/072486
§ 371 (c)(1),
(2) Date: May 29, 2015

(87) PCT Pub. No.: WO2014/085762
PCT Pub. Date: Jun. 5, 2014

(65) Prior Publication Data
US 2015/0307798 A1    Oct. 29, 2015

Related U.S. Application Data

(60) Provisional application No. 61/731,694, filed on Nov. 30, 2012.

(51) Int. Cl.
C10L 5/44 (2006.01)
C10L 9/08 (2006.01)
(Continued)

(52) U.S. Cl.
CPC .............. *C10L 5/447* (2013.01); *C10L 5/08* (2013.01); *C10L 5/28* (2013.01); *C10L 5/36* (2013.01);
(Continued)

(58) Field of Classification Search
USPC .................................. 44/530, 590, 636
See application file for complete search history.

(56) References Cited

U.S. PATENT DOCUMENTS

| 3,177,821 A | 4/1965 | Harrington |
| 3,354,844 A | 11/1967 | Roll et al. |
| 2012/0110896 A1 | 5/2012 | Coronella et al. |

FOREIGN PATENT DOCUMENTS

| EP | 2 154 227 | 2/2010 |
| WO | WO 2010/089342 | 8/2010 |

(Continued)

OTHER PUBLICATIONS

Reza et al. "Pelletization of biochar from hydrothermally carbonized wood," *Environmental Progress & Sustainable Energy*, 31(2): 225-235, Jul. 29, 2012.

(Continued)

*Primary Examiner* — Randy Boyer
*Assistant Examiner* — Chantel Graham
(74) *Attorney, Agent, or Firm* — Klarquist Sparkman, LLP

(57) ABSTRACT

Disclosed herein is a binder-free product and process for making the product. The product is a mechanically stable, water resistant torrefied biomass product that does not comprise an extrinsic binder additive. The product is made using a combination of appropriate pre-treatment steps and compressing the conditioned biomass feedstock into a thermally managed compaction device comprising at least one modified die. The modified die allows for differential cool- (Continued)

ing/heating modifications so as to control the temperature near the entrance to the compaction device and passing the formed torrefied biomass into a post-formation curing zone.

17 Claims, 4 Drawing Sheets

(51) Int. Cl.
    *C10L 5/28*     (2006.01)
    *C10L 5/36*     (2006.01)
    *C10L 5/08*     (2006.01)
    *C10L 5/04*     (2006.01)

(52) U.S. Cl.
    CPC ............... *C10L 5/361* (2013.01); *C10L 9/083* (2013.01); *C10L 5/04* (2013.01); *C10L 2290/06* (2013.01); *C10L 2290/146* (2013.01); *C10L 2290/28* (2013.01); *C10L 2290/30* (2013.01); *C10L 2290/36* (2013.01); *C10L 2290/546* (2013.01); *C10L 2290/562* (2013.01); *C10L 2290/58* (2013.01); *Y02E 50/10* (2013.01); *Y02E 50/15* (2013.01); *Y02E 50/30* (2013.01)

(56) References Cited

FOREIGN PATENT DOCUMENTS

| | | |
|---|---|---|
| WO | WO 2010/093310 | 8/2010 |
| WO | WO 2012/074374 | 6/2012 |
| WO | WO 2012/106801 | 8/2015 |

OTHER PUBLICATIONS

Bergman, "Combined torrefaction and pelletisation," http://www.ecn.nl/docs/library/report/2005/c05073.pdf; Retrieved on Aug. 10, 2006. (29 pages).

International Search Report and Written Opinion from International Application No. PCT/US2013/072486, dated May 5, 2014 (13 pages).

METHOD AND PROCESS FOR PRODUCING A WATER-RESISTANT, MECHANICALLY STABLE FORM OF TORREFIED BIOMASS

CROSS REFERENCE TO RELATED APPLICATION

This application is the U.S. National Stage of International Application No. PCT/US2013/072486, filed Nov. 29, 2013, which was published in English under PCT Article 21(2), which in turn claims the benefit of the earlier filing date of U.S. Provisional Application No. 61/731,694, filed Nov. 30, 2012, which is hereby incorporated by reference in its entirety.

FIELD

The present disclosure relates to embodiments of a binder-free compacted torrefied biomass product, and embodiments of a system and method for making the product.

BACKGROUND

Torrefied cellulosic biomass may be considered a carbon-neutral solid fuel capable of substituting for coal in powdered coal fired combustion units, such as those found in electricity-generating facilities. The carbon neutrality comes about since the carbon dioxide produced by combusting the torrefied cellulosic biomass is in turn consumed by the photosynthesis of carbon dioxide and water to form cellulose, thus closing the carbon cycle by utilizing nature's own resources.

Torrefaction is a process whereby cellulosic biomass is heated in a diminished oxygen environment at temperatures of from 240° C. to 300° C. resulting in water loss and causing volatile organic compounds to evaporate from the biomass. After torrefaction, the original moist biomass is converted to a brittle, brown, low-density solid with a high energy content per unit mass. However, to be economically viable as a coal substitute, the torrefied biomass must have its bulk density dramatically increased so as to facilitate storage and shipment, and keep associated costs, including transportation, to a minimum.

Procedures for compacting torrefied biomass are mentioned in the prior art but rarely discussed in detail. In GB 2448531, torrefied biomass is compacted and presented in pelletized form involving a process using an oil-based binder additive. The binder is necessary to address the brittleness and friability that would otherwise be exhibited by the pellet. The use of an extrinsic binder when preparing compacted torrefied biomass capable of serving as a coal fuel substitute is not desirable, as it provides the energy-generating industry with additional environmental issues the industry is striving to avoid. Obstacles associated with making compacted torrefied biomass that is prepared in the absence of an extrinsic binder additive include the fragile nature of the biomass, as it typically breaks and disintegrates when subject to physical mechanical forces. Other obstacles that must be addressed include a high degree of water uptake, which is an undesirable property, as it frequently leads to disintegration of the compacted biomass, or pellet. Consequentially, there exists a need to provide methods and systems for making compacted torrefied biomass that does not exhibit these undesirable properties and that can be made without an extrinsic binder additive. These methods/systems also should be capable of making biomass products having improved physical attributes.

SUMMARY

Disclosed herein are embodiments of a process for manufacturing binder-free compacted torrefied biomass that exhibits attractive physio-mechanical properties, including the ability to reduce or limit water absorption. Embodiments of the disclosed product comprise binder-free, compacted torrefied biomass having an average mass density of at least about 1.1 g/cm$^3$ to about 1.3 g/cm$^3$ and from about 20 wt % to about 35 wt % water absorption after submersion for about 24 hours in water at ambient conditions. In some embodiments, the product consists essentially of compacted torrefied biomass. Certain embodiments of the product may have a mass density that ranges from about 1.1 g/cm$^3$ to about 1.2 g/cm$^3$. The water uptake of the product may range from about 25 wt % to about 35 wt %. Embodiments of the product typically have a friability index ranging from about 15 to about 50, such as from about 15 to about 30. The product may be formulated for use as a commercial fuel source. For example, the product may be formulated for use in a combustion-energy generation process or metal oxide reduction process.

Also disclosed herein are embodiments of a method for making binder-free compacted torrefied biomass. In some embodiments, the method comprises milling uncompacted torrefied biomass to have an average particle size of about 0.1 mm to less than about 10 mm, sieving the uncompacted torrefied biomass, conditioning the uncompacted torrefied biomass to increase its moisture content to about 5% to about 15%, compacting the uncompacted torrefied biomass in a compaction device without an extrinsic binder additive, and curing the compacted torrefied biomass in a post-compaction device to produce the compacted torrefied biomass having an average mass density of at least about 1.1 g/cm$^3$ to about 1.3 g/cm$^3$ and that absorbs from about 20 wt % to about 35 wt % water after submersion for about 24 hours in water having a temperature of about 25° C. and at ambient pressure. The method can comprise using a compaction device comprising at least one die modified to comprise an opening defining an inlet and an outlet. The inlet can be configured to have a temperature of from about 80° C. to about 140° C. The outlet can be configured to have a temperature of from about 120° C. to about 140° C. In some embodiments, the compaction device is operated to provide residence time of the biomass as it passes through the die modified to comprise the opening with the residence time ranging from about 5 seconds to about 15 seconds. The compaction device can be operated to provide a compression ratio of at least 3:1, such as 4:1, 5:1, 6:1, or 7:1.

In certain embodiments of the method, the compaction device is a cuber. In embodiments using a cuber, the cuber can be fitted with at least one die that is modified to comprise an opening defining an inlet having a temperature ranging from about 80° C. to 140° C., and an outlet having a temperature ranging from about 120° C. to about 140° C. The cuber can be operated to provide a biomass residence time ranging from about 5 seconds to about 15 seconds as it passes through the die modified to comprise the opening.

Curing typically comprises passing collected compacted torrefied biomass through an oven set at a temperature of from about 80° C. to about 150° C. (e.g., about 100° C. to about 145° C., or about 100° C. to about 140° C.). In some embodiments, the compacted torrefied biomass is heated in the oven for less than about 5 minutes. The oven may be a conveyor oven. In some embodiments it can be selected from a convection oven, a radiant oven, or a microwave oven. In preferred embodiments, the oven is a microwave oven and the compacted torrefied biomass is heated in the microwave oven for about 10 second to about 30 seconds.

Embodiments of a system for making the torrefied biomass also are disclosed herein. The system may comprise a first stabilizer/conditioner component configured to receive a torrefied biomass feedstock and apply a liquid to the torrefied biomass, a compaction device configured to receive the torrefied biomass feedstock from the first stabilizer/conditioner component and capable of compacting torrefied biomass to have a mass density greater than that of the torrefied biomass feedstock, and a second stabilizer/conditioner component configured to receive the compacted torrefied biomass and thermally cure the compacted torrefied biomass. The first stabilizer/conditioner component typically comprises a milling component and a sieving component. In some embodiments, the milling component is a twin roll mill. The sieving component may be a mesh screen. The compaction device can comprise at least one die modified to comprise an opening defining an inlet and an outlet. The inlet can be configured to have a temperature of about 80° C. to about 140° C., and the outlet can be configured to have a temperature of about 120° C. to about 140° C. Certain embodiments concern a system comprising a compaction device that is a cuber. The second stabilizer/conditioner component can be an oven. In some embodiments, the oven is connected to a conveyor belt and is selected from a convection oven, a radiant oven, or a microwave oven.

Also disclosed herein is a method for making compacted torrefied biomass with a water uptake of less than about 35 wt % after total submersion for a period of about 24 hours in water at ambient conditions, comprising heating compacted torrefied biomass in an oven maintained at about 80° C. to about 150° C. for less than about 5 minutes.

The foregoing and other objects, features, and advantages will become more apparent from the following detailed description.

DETAILED DESCRIPTION

Figure 1:
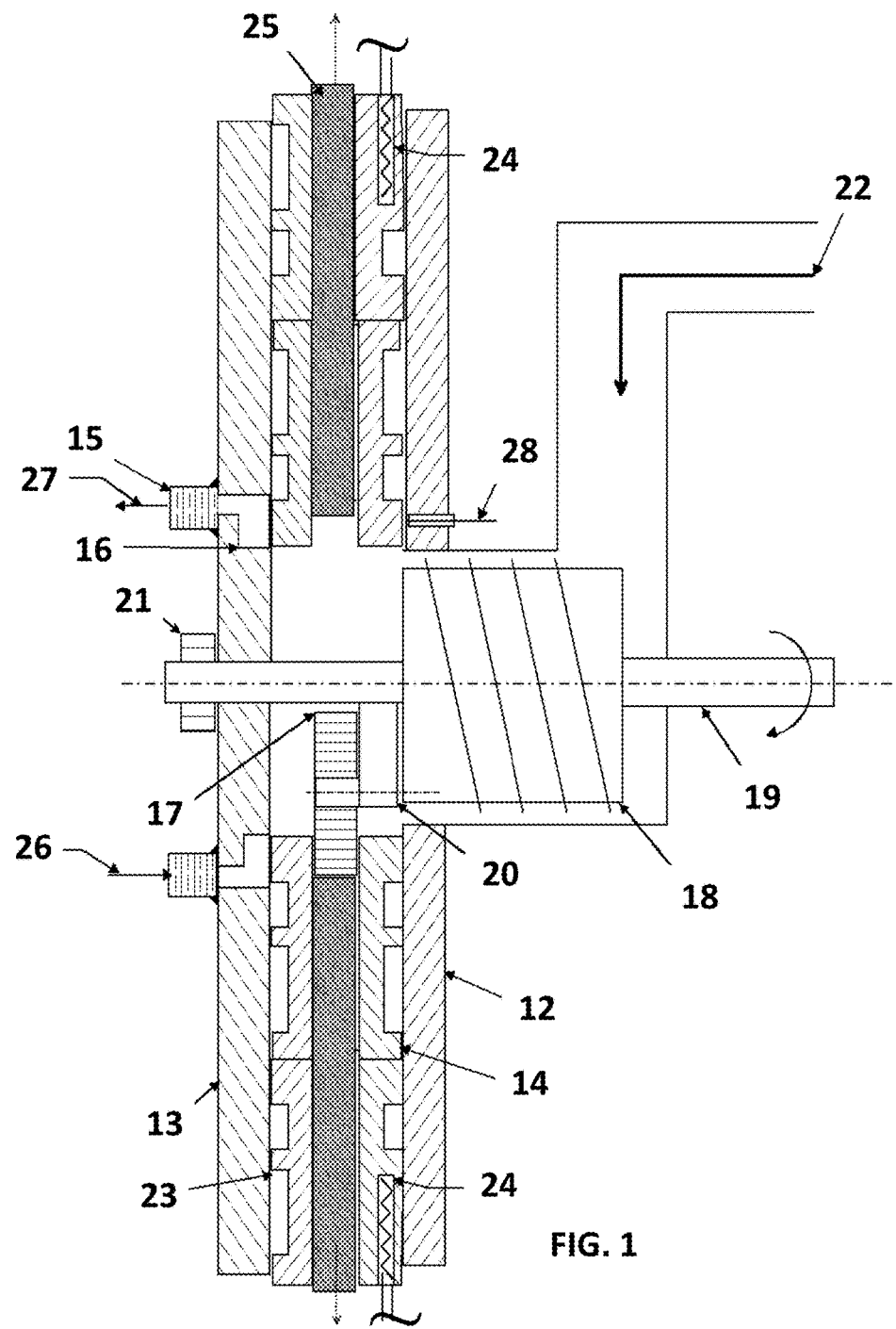
FIG. 1 is a cross-sectional side view of a portion of an embodiment of the apparatus disclosed herein for making a disclosed embodiment of compacted torrefied biomass.

Disclosed herein are embodiments of a compacted torrefied biomass product and embodiments of a system and method for making the product. A variety of factors contribute, both alone and in combination, to the compacted torrefied biomass product's superiority over that known in the art. For example, the feed quality, operating conditions, and operating parameters of the method and system disclosed herein provide a mechanically stable product. Also, the configuration of the machine used to densify the torrefied biomass, as well as the post-forming curing process, allows slower chemical reactions to take place within the product, thereby contributing to product wet strength.

One aspect of the presently disclosed technology concerns a product comprising compacted torrefied biomass that is free of any extrinsic additive binder. In some embodiments, the product consists of, or consists essentially of, compacted torrefied biomass. The density of the uncompacted torrefied biomass such as the torrefied biomass feedstock disclosed herein typically is about 0.3 g/cm$^3$. The compacted torrefied biomass of the present disclosure, however, has a density that is increased as compared to the uncompacted torrefied biomass, such as an increase that is about five-fold to about eight-fold over that of the uncompacted torrefied biomass. In some embodiments, the compacted torrefied biomass has a density of at least about 1.1 g/cm$^3$. For example, the compacted torrefied biomass can have a density ranging from about 1.1 g/cm$^3$ to about 1.3 g/cm$^3$, or about 1.1 g/cm$^3$ to about 1.2 g/cm$^3$. The increased density of the compacted torrefied biomass feedstock, in comparison to uncompacted torrefied biomass, can be obtained using the method and system disclosed herein. In some embodiments, the increased density results from the disclosed system's ability to impart an effective compression ratio of at least 3:1 (e.g., 4:1, 5:1, 6:1, 7:1), with some embodiments having an effective compression ratio of about 8:1. The compression ratio may be measured directly or indirectly. In some embodiments, the compression ratio was determined indirectly by comparing the density of an embodiment of the product made using an embodiment of the method disclosed herein with the density of a hand-pressed briquette.

The compacted torrefied biomass is mechanically stable such that a five-fold repeated drop of six feet onto a hard surface retains over about 70% of the original shape's configuration with less than about 30% forming smaller fractions. The compacted torrefied biomass is stable in water, with a reversible water uptake of less than about 35% (such as about 20% to about 35%, or about 25% to about 30%) after a 24 hour exposure period at ambient conditions, while maintaining its original shape. Together, the high density, low water uptake and mechanical stability give the compacted torrefied biomass a unique character similar to sub-bituminous coal. The product also may exhibit a friability index ranging from about 15 to about 50, or about 15 to about 30. Exemplary embodiments of the disclosed compacted torrefied biomass have a compression ratio of about 3:1 and are made using a compaction temperature of about 100° C. to about 110° C. and a post-formation curing treatment at a temperature of about 120° C.

Also disclosed herein is a system for manufacturing a compacted torrefied biomass having a high density, high mechanical stability, and high water resistance without the use of an extrinsic binder additive. Such a system comprises a first stabilizer/conditioner component, which receives a torrefied biomass feedstock sized to less than 10 mm, such as from about 0.1 mm to about 10 mm. Prior to entering the first stabilizer/conditioner component, the torrefied biomass feedstock is substantially moisture-free. For example, the torrefied biomass feedstock, prior to entering the first stabilizer/conditioner component, may have a moisture content of 0% moisture to about 5% moisture. The first stabilizer/conditioner component can further be configured to accept a fluid, such as water, steam, or a combination thereof, which can be combined with the torrefied biomass feedstock to increase its moisture content to between about 5% and about 15% (such as from about 6% to about 10%, or about 7% to about 9%, or about 7.5% to about 8.5%). For example, water may be added to increase the moisture content of the feedstock, or the feedstock may be heated with steam to increase the moisture content of the feedstock. In some embodiments, a combination of water and steam may be used. The water and/or steam may be introduced into the stabilizer/conditioner component manually or it may be introduced through an inlet or a nozzle at a rate and amount that is controlled by an external flow controller device. In some embodiments, water and/or steam is introduced into the feedstock as it passes through the stabilizer/conditioner component. Water can be added using a series of fine spray nozzles, which distributed the water over the surface of the feedstock. Alternatively, at least a portion of the water may be added in the form of steam using similar nozzles to distribute the steam over the feedstock. The amount of water/steam to be added can be controlled using a moisture sensor located at the discharge end of the stabilizer/conditioner component with a feedback control modulating a throttle valve on the water/steam supply. In exemplary embodiments, the first stabilizer/conditioner component is an apparatus comprising a milling device, such as a twin roll mill, and a blending device, such as an industrial-scale blender or mixer.

The system also comprises a compaction device configured to receive the conditioned torrefied biomass feedstock from the first stabilizer/conditioner component and convert it into compacted torrefied biomass having a mass density greater than that of the uncompacted torrefied biomass. For example, the uncompacted torrefied biomass feedstock may have a density ranging from about greater than zero $g/cm^3$ to about 0.3 $g/cm^3$, whereas the compacted torrefied biomass exhibits an increased density that ranges from about a two-fold increase to a four-fold increase. In some embodiments, the density of the compacted torrefied biomass can range from about 1.1 $g/cm^3$ to about 1.3 $g/cm^3$. In particular disclosed embodiments, the compaction device is a cuber as described below.

A conventional "cuber" is described in U.S. Pat. Nos. 3,354,844, and 3,177,821, which are incorporated herein by reference. FIG. 1 is a schematic diagram of a cuber that is modified to provide localized cooling. The cuber typically comprises at least one die having a shape and length selected to provide sufficient compression force and duration at particular temperatures to produce a dense, rigid product. The cuber comprises a circular arrangement of dies (14), which are clamped between two facing plates (12, 13). A press wheel (17) mounted on an eccentric crank shaft (20) rotates to press the torrefied biomass feedstock into the dies (14). A screw conveyor (18), which makes up a portion of the drive shaft (19), conveys the torrefied biomass feedstock into the space between the press wheel (17) and the die opening. As the press wheel (17) passes over each die opening, the torrefied biomass feedstock is forced into each die (14). The frictional resistance to the flow of the compressed torrefied biomass feedstock through the die results in a back pressure at the point where the press wheel (17) and the die opening converge. The frictional force at this point generates heat in the modified cuber shown in FIG. 1. Each die can also be provided with die extensions (23) which may include an immersion-type electrical heating element (24). This modification can be used to provide a longer retention time in the die at a given machine speed and feed rate and thereby provide enhanced thermal management of this system. The longer residence time at an elevated temperature can provide more time for the chemical condensation reaction of water and lignin to take place and may impart a higher mechanical strength to the product. For example, the torrefied biomass may reside in the die for about 5 seconds to about 10 seconds at a temperature of about 120° C. to about 160° C., such as about 120° C. to about 150° C., or about 120° C. to about 140° C.

However, cubers having just an extended, heated die may not have an effective controller to control the operation of the unit for long durations of time, such as those units used for continuous processing. A need exists to provide controlled duration times in the forming die at a modest temperature; thus, the temperature should be carefully controlled. The temperature achieved in the die can vary depending upon the system throughput, as well as the constitution of the torrefied biomass feedstock (such as its moisture content and particle size). Furthermore, as the action of the press wheel can generate heat, the temperature near the die opening can be controlled independently from the temperature of the die, or die extension, thereby providing the ability to control the temperature of different portions of the compaction device.

Figure 3:
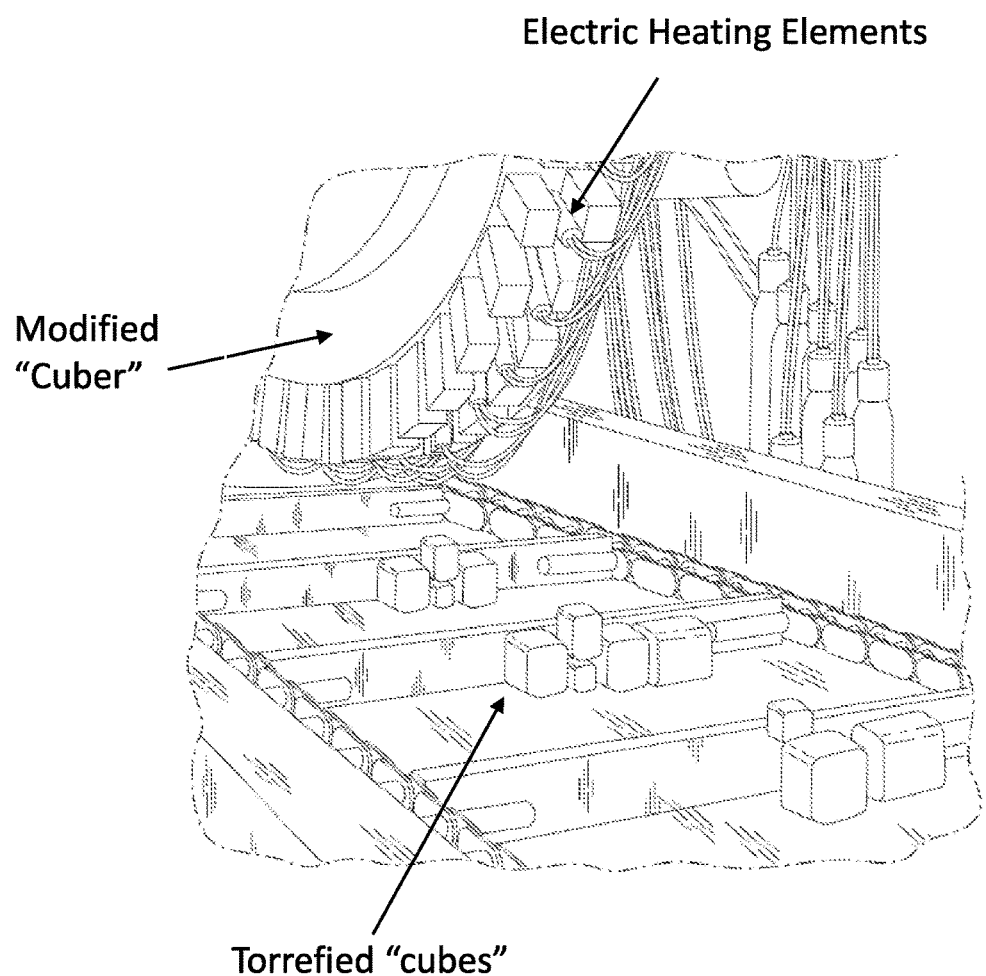
FIG. 3 is a photographic image of an embodiment of a disclosed modified compaction device.

To facilitate this type of temperature control, the cuber may be further modified (as illustrated in FIG. 1 and FIG. 3) to provide an independently-controlled coolant flow in a cavity (16) in close thermal contact with the area where the press wheel (17) and the die (14) come together. The coolant flow may be controlled by a controller that takes a temperature indication from a sensor near the die entrance and modulates the temperature or flow rate of the circulating coolant that passes through couplings 26 and 27. The coolant may be selected from water or a low-viscosity, non-flammable oil (such as mineral oil, castor oil, silicon oil, fluorocarbon oils, transformer oil, or combinations thereof). The cooling system can be used to control the temperature at the die entrance, without the need to accommodate the entire heat energy imparted by the motor driven press wheel and thereby provide enhanced thermal management of this system. For example, the cooling system can be used to control the temperature of the die entrance to be less than about 140° C. (such as about 80° C. to about 130° C., or about 80° C. to about 120° C., or about 80° C. to about 110° C.). As the temperature at this control point typically can rise rapidly after start-up of the cuber, the cooling system also can be used to modulate this variable heat load. Overheating of the die entrance may lead to fouling of the die due to the thermosetting reaction of lignin contained within the torrefied biomass feedstock. A still further modification of the cuber may be to have either individual or a number of proximate located dies have the coolant flow modulated according to the temperature of the individual or range of dies. This allows controlling individual dies of a commercial scale cuber, which may have from as few as ten to as many as 60 or more depending upon the scale of operation. The disclosed system thereby provides enhanced thermal management—that is, modifying the die as disclosed herein provides the ability to manage the temperature of different portions of the cuber and produce a product having increased stability.

By providing conduction cooling at the die inlet, the temperature of the die and the extended die may be controlled independently. By supplying external heat using an immersion-type electrical heating element to the extended dies both the temperature of the initial forming action and the temperature of the post-forming action may be controlled independently of one another. The temperature of the post-form, extended die may be between 70° C. and 140° C., and more preferably between 85° C. and 110° C. and most preferably between 90° C. and 110° C.

Figure 4:
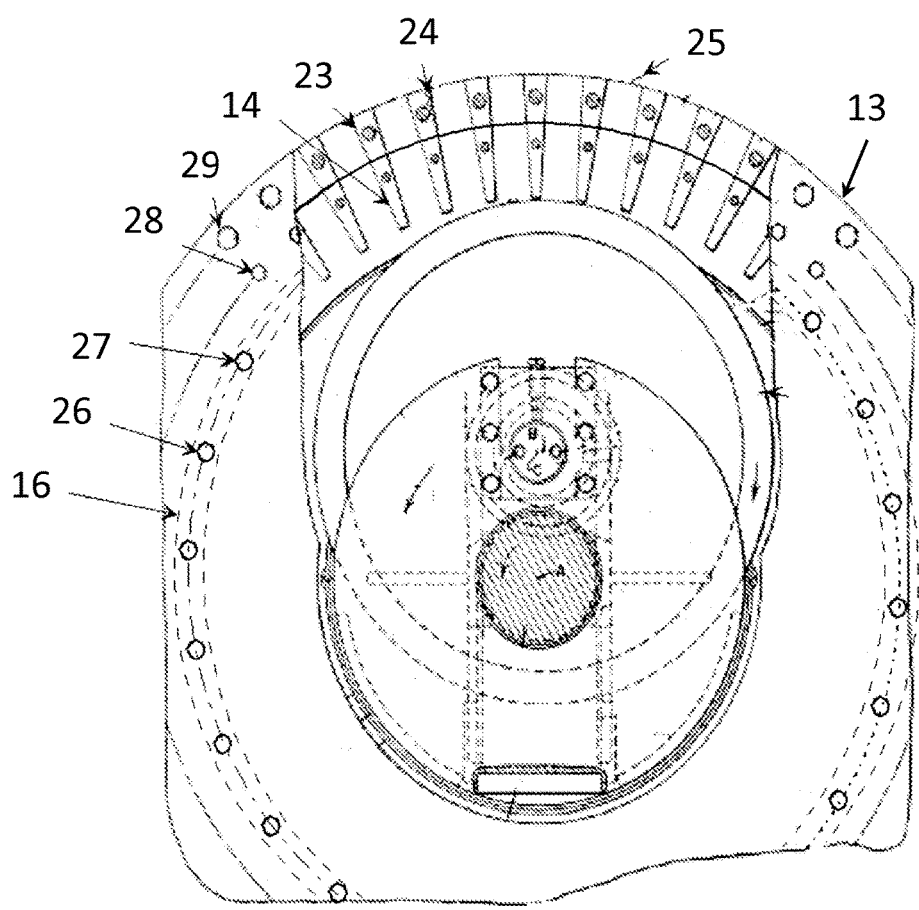
FIG. 4 is a fragmentary sectional view, partly in elevation, of a modified cover plate, as well as modified dies, that can be used in a disclosed compaction device.

An example of an embodiment of a modified cover plate and modified die is illustrated in FIG. 4. According to FIG.

4, a series of die pairs (14, 23) are arranged circumferentially around the mounting plate 12 (as illustrated in FIG. 1) and are held in place by cover plate (13) using bolts (29) and (28) which pass through the individual dies. The cover plate 13 is modified by machining a channel 16 (also illustrated in FIG. 1) into the inside face of the cover plate and covering the channel with a plate seal welded to the inside face of the cover plate so as to form a channel for a heat transfer fluid. A series of fluid intake and exit channels are provided by means of couplings 26 and 27 (also illustrated in FIG. 1), which are welded to the outside of the cover plate 13. The radial position of the channel is such that it is close to the location of the circumference marked by the path of the press wheel (17) and correspondingly close to the point where the maximum frictional, compressive force is exerted on the feedstock as it is forced into the inlet of the die. Die extensions (23) are provided with immersion-type heating elements (24) to provide a counter flowing heat that maintains the temperature of the compressed feed. Not shown in FIG. 4 is an external circulation cycle for the heat transfer fluid used to control the temperature of the die inlet using the indication of thermocouple (also illustrated in FIG. 1) and a thermocouple associated with the immersion-type heating elements (24) for maintaining the overall thermal gradient of the entire die face. The number of fluid inlets and exits (as defined by couplings 26 and 27) can be selected to be any number suitable for the particular thermal load that each embodiment of the cuber can accommodate. In some embodiments, when machining the channel (16) in the inside face of the cover plate (13), un-machined "dams" can be left to selectively partition the circumference of the cooling channel.

In addition to the modification of the cuber machine to allow more individualized control of the die temperature, the operating parameters of the cuber may be controlled within a narrow range. In some embodiments, a maximum die temperature is used; however, this maximum temperature must be controlled so as not to increase to a temperature whereby steam in the cubed torrefied biomass product exceeds the frictional pressure between each die and each cubed product. If the temperature is too high (e.g., above about 170° C., such as about 180° C. to about 200° C.), then the cubed product is more likely to be expelled from the die without being properly processed. Also, the throughput of the compaction device can be modulated by varying the rotational speed of the press wheel. The feed rate also can be modulated such that at a given press wheel rotational speed, only a portion of the dies are actively in service. Together these two parameters can be used to control not only the machines production rate, but also provide a more uniform environment for the feedstock as it is passed through the compression zone of the dies.

Embodiments of the disclosed system also comprise a second stabilizer/conditioner component configured to receive the compacted torrefied biomass and subject it to a post-compaction thermal curing treatment. For example, the biomass product produced by the cuber is expelled from the cuber onto a conveyor for transport to a close-coupled heating zone where final curing occurs. The heating zone may be a conventional convection oven, a radiant oven or a microwave energized oven. Using the second stabilizer/conditioner component allows residual moisture in the product to react with the residual un-reacted lignin in the compacted torrefied biomass product, providing a high strength, hydrolytically stable, compacted torrefied biomass product with a high fuel value.

Also disclosed is a method for making a compacted torrefied biomass product. An embodiment of the disclosed method is illustrated schematically in FIG. 2. One disclosed embodiment comprises a method for making a product having a density of at least about 1.1 g/cm$^3$. Such products may also have a stable form which exhibits less than about 30% friability in a drop test and which maintains its form after submersion in water for 24 hours at ambient conditions with a water adsorption of less than about 35%. One disclosed embodiment concerns milling and sieving torrefied biomass feedstock to achieve a particle size of less than about 2 mm in its greatest dimension, conditioning the sized torrefied biomass feedstock to have a moisture content of from about 5% to about 15%, and more preferably between about 7.5 wt % and about 8.5 wt %, compacting the conditioned, sized torrefied biomass feedstock in the absence of an extrinsic binder additive by passing it through a compacting device, and subjecting the compacted torrefied biomass to a post compaction curing treatment in the heating zone.

Figure 2:
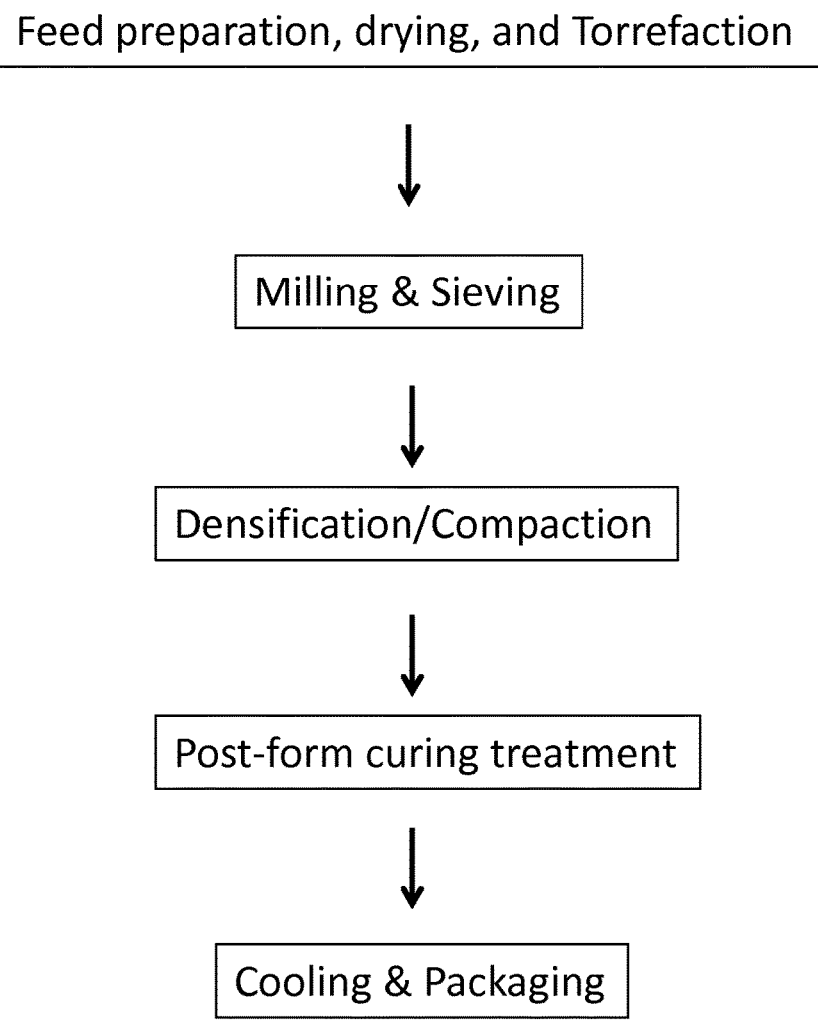
FIG. 2 is a flow diagram illustrating an embodiment of a disclosed method for making a disclosed embodiment of compacted torrefied biomass.

Embodiments of the disclosed method typically use a suitably torrefied feedstock. As illustrated in FIG. 2, a feedstock of uncompacted torrefied biomass feedstock is used. This feedstock is obtained by using a pretreatment step, with the parameters of the pretreatment step being based on the particle cross section of the biomass, as well as its moisture content and the particular species of biomass used. For example, the feedstock in some embodiments is made by subjecting biomass to an oxygen depleted environment at a temperature of about 240° C. to about 300° C. for a period of between about 5 minutes and about 30 minutes.

After this torrefaction/pretreatment step, the feedstock is sized in the first stabilizer/conditioner component. In some embodiments, the feedstock has an initial size of about 0.1 mm to about 10 mm in the largest dimension and is further sized using a suitable grinder or mill and sieved to provide a material with an average particle size of less than about 2 mm. In some embodiments, milling may include using a twin roll mill to grind the torrefied biomass to the desired particle size. Sieving may include passing the milled torrefied biomass through a screen having a pore size capable of retaining only a fraction having a particle size of about 2 mm or less. Suitable screens may have a sieve (or mesh) size ranging from about 10 (e.g., about 2 mm) to about 35 (e.g., about 0.5 mm).

The feedstock is then conditioned in a blender where a controlled amount of water is added and blended uniformly into the feedstock. The feedstock may also be heated during this step such as by using steam as a source of moisture. In some embodiments, the conditioned feedstock may have a moisture content ranging from about 5% to about 15%, preferably from about 6% to about 10% and most ideally from about 7.5% to about 8.5%. The conditioned feed stock may be fed to a compaction device at a rate depending upon the capacity of the compaction device. In some embodiments, the feed rate ranges from about 500 kg/hr to about 5,000 kg/hr, such as about 500 kg/hr to about 4,500 kg/hr, or about 600 kg/hr to about 4,000 kg/hr, or about 700 kg/hr to about 3,500 kg/hr.

Once the feedstock exits the first stabilizer/conditioner component, it enters the compaction device. The compaction device comprises one or more die, which may be modified to have certain temperature parameters as disclosed herein. The dies of the compaction device will form the feedstock into cubes of compacted torrefied biomass. The amount of time that the compressed torrefied biomass resides in contact with the die can be controlled by the feed rate into the cuber and the cuber's rotational speed. In some embodiments, a residence time of between about 5 seconds and about 30 seconds (such as 5 seconds to 15 seconds) may be used. In some embodiments, the residence time may range between about 7 seconds and about 10 seconds. Once the cubes have been formed, they are expelled from the compaction device.

As the cubes exit the compaction device, they may be immediately transferred (such as by a conveyer belt) to a heating zone, where the residual moisture within each cube may be removed and/or reacted with residual lignin such that the uncured cubes achieve a uniform internal temperature of at least about 120° C. In some embodiments, the temperature of the heating zone, which typically is an oven capable of heating the product. In some embodiments, the oven is set at a temperature that ranges from about 80° C. to about 150° C. (such as from about 100° C. to about 145° C., or about 100° C. to about 140° C.). The cubes may be heated for less than 5 minutes, such as about 2 seconds to about 4 minutes or about 2 seconds to about 3 minutes, or about 2 seconds to about one minute. The cured cubes may then be cooled to a temperature of less than about 120° C. and packaged for shipment.

Disclosed products may be packaged in a variety of containers depending upon the transportation mode and distance. For example, standard bulk bags with a capacity of up to about 80 ft$^3$ may be used, as well as portable metal or plastic bins of similar capacity. Products also can be shipped in open railroad hopper cars, which may be dumped by rotating the entire car. Overseas shipment also may be conducted using bulk bags or bins, or even as bulk cargo, since the material is stable to ordinary handling and is not affected by long term water exposure. No special precautions are required for long term open storage.

A further aspect of the technology disclosed herein is a method of providing compacted torrefied biomass with a water uptake of less than 35% (such as between about 20% to about 35%) after total submersion in water for a period of about 24 hours at ambient conditions, with mechanical stability such as to withstand multiple drops from 6 ft onto a hard surface while retaining at least 70% of its original mass, or both. In particular disclosed embodiments, the method comprises exposing the compacted torrefied biomass to an oven capable of producing an energy level of less than about 100 watt hours per pound of compacted torrefied biomass. In some embodiments, the oven is a microwave oven.

Also disclosed is the use of a compacted torrefied biomass product that has been formulated for use as a fuel source. In some embodiments, the product can be formulated for use in a combustion-energy generation process or in a metal oxide reduction process. The compacted, weather resistant, and mechanically stable biomass may be used as a replacement for coal in powdered coal fire energy units, such as electricity-generating plants and cement manufacturing plants. Because of its high carbon content and stability, the compacted torrefied biomass may also be used to reduce metal oxides, such as iron ore, to produce steel or reducing silica to form metallurgical grade silicon. The compacted torrefied biomass may also be a raw material for making graphite.

EXAMPLES

Example 1

Pine wood biomass, which had been torrefied at 280° C. for 15 minutes, was milled in a twin roll mill and screened to retain only the fraction less than 2 mm. The torrefied pine was then mixed with water and steam to give a moisture content of 7.5-8.5%. The moist, milled, torrefied pine was then fed to a "cuber" fitted with 32×32 mm×355 mm long dies capable of achieving a compression ratio of 3.6:1. The feed rate was 1,000 kg/hr. The material exited the cuber as long square cross section extrudates which broke off as they hit a conveyor underneath the cubing head. The length of the extrudates varied from about 75 to 178 mm in length. There was little to no dust and no broken "cubes." The temperature of the cuber at the die face location measured using an infrared pyrometer was between 37° C. and 48° C., while the temperature of the extrudate was between 39° C. and 109° C. Then 100 gram of extruded, dense torrefied pine was placed into a 1200 watt microwave oven and exposed for 0.3 minutes. The resulting cured "cubes" had a density of 1.18-1.19 g/cm$^3$. After soaking in water at ambient temperature for 20 hours, the moisture uptake was 28%. A drop test was conducted on the cubes and compared with Powder River Basin sub-bituminous coal.

Torrefied Cubes—Post-Form Treatment Stability Tests
A modified ASTM 440 "drop test" to determine size stability and friability
Sample size: 70-100 Gram
All pieces are screened to 38 mm×25 mm (1½"×1"). (All feed particles are retained on a 1" screen.)
Sample is dropped from a 183 cm (6 foot) elevation onto a steel plate.
Drop is repeated 6 times.
Sample is fractionated by 1", ¾", ½", ¼", and ⅛" sieves after the six drops.
Size Stability value is computed by multiplying the weight percent of material retained on a sieve by a normalizing factor (a factor which is the size of the screen (in inches) of material collected).

Comparative Example 1—PRB Coal

Drop test 1: PRB Coal, 3 chunks larger than 1" & smaller than 1½" 75.8 g
Eagle Butte, WY Mine, Sub-bituminous

| Sieve Size, inches | | Weight retained, g | Weight % retained (1) | Average of Sieve Opening | | Product of (1) × (2) |
|---|---|---|---|---|---|---|
| Retained on | Passing | | | Inches | Normalizing Factor (2) | |
| 1 | 1½ | 24.4 | 32.19 | 1.25 | 1 | 32.19 |
| ¾ | 1 | 8.7 | 11.47 | 0.875 | 0.7 | 8.03 |
| ½ | ¾ | 10.9 | 14.38 | 0.625 | 0.5 | 7.19 |
| ¼ | ½ | 16.7 | 22.03 | 0.375 | 0.3 | 6.61 |
| ⅛ | ¼ | 6.5 | 8.58 | 0.188 | 0.15 | 1.29 |
| — | ⅛ | 8.6 | 11.35 | 0.06 | 0.048 | 0.54 |
| | | 75.80 | | | | |
| | | | | | Size Stability | 55.85 |
| | | | | | Friability | 44.15 |

Example 2—Compacted Torrefied Biomass

Drop test 2: Post-cubed heat treated 280° C., 15 minutes. 3 cubes, 91.2 g

| Sieve Size, inches | | Weight retained, g | Weight % retained (1) | Average of Sieve Opening | | Product of (1) × (2) |
|---|---|---|---|---|---|---|
| Retained on | Passing | | | Inches | Normalizing Factor (2) | |
| 1 | 1½ | 75.7 | 83.00 | 1.25 | 1 | 83.00 |
| ¾ | 1 | 0 | 0.00 | 0.875 | 0.7 | 00.0 |
| ½ | ¾ | 2.4 | 2.63 | 0.625 | 0.5 | 1.32 |
| ¼ | ½ | 3.5 | 3.84 | 0.375 | 0.3 | 1.15 |
| ⅛ | ¼ | 2.2 | 2.41 | 0.188 | 0.15 | 0.36 |
| — | ⅛ | 7.4 | 8.11 | 0.06 | 0.048 | 0.39 |
| | | 91.2 | | | | |
| | | | | | Size Stability | 86.22 |
| | | | | | Friability | 13.78 |

The post-form, heat-treated, densified torrefied pine was more mechanically stable and less friable than typical coal. The moisture uptake was modest, but the material did not lose its shape.

Example 3

Weatherability—

In a further test of the durability of the densified torrefied biomass, a collection of the compacted torrefied cubes were stored outdoors over the winter in the Pacific Northwest and thus were exposed to snow, rain and numerous freeze-thaw cycles. The material was examined in the spring, did not lose any of its mechanical properties and had a moisture content of less than 30%.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A product, comprising binder-free, compacted torrefied biomass having an average mass density of at least about 1.1 g/cm$^3$ to about 1.3 g/cm$^3$ and from about 20 wt % to about 35 wt % water based on the weight of the product after submersion for about 24 hours in water at ambient conditions as compared to the weight of the product prior to submersion.

2. The product of claim 1 consisting essentially of compacted torrefied biomass.

3. The product of claim 1 wherein the mass density ranges from about 1.1 g/cm$^3$ to about 1.2 g/cm$^3$.

4. The product of claim 1 wherein the product has a water uptake ranging from about 25 wt % to about 35 wt %.

5. The product of claim 1 wherein the product has a friability index ranging from about 13 to about 50.

6. A method for making binder-free, compacted torrefied biomass, comprising:
   milling uncompacted torrefied biomass to have an average particle size of about 0.1 mm to less than about 10 mm;
   sieving the uncompacted torrefied biomass;
   conditioning the uncompacted torrefied biomass to increase its moisture content to about 5% to about 15%;
   compacting the uncompacted torrefied biomass in a compaction device without an extrinsic binder additive, wherein the compaction device comprises at least one die modified to comprise an opening defining an inlet and an outlet, and wherein the inlet is configured to have a temperature of from about 80° C. to about 140° C. and the outlet is configured to have a temperature of from about 120° C. to about 140° C.; and
   curing the compacted torrefied biomass in a post-compaction device to produce the compacted torrefied biomass having an average mass density of at least about 1.1 g/cm$^3$ to about 1.3 g/cm$^3$ and that absorbs from about 20 wt % to about 35 wt % water based on the weight of the compacted torrefied biomass after submersion for about 24 hours in water having a temperature of about 25° C. and at ambient pressure as compared to the weight of the compacted torrefied biomass prior to submersion.

7. The method of claim 6 wherein the uncompacted torrefied biomass is sized to have an average particle size of less than about 2 mm.

8. The method of claim 6 wherein the compaction device is a cuber.

9. The method of claim 8 wherein the cuber is fitted with at least one die that is modified to comprise an opening defining an inlet having a temperature ranging from about 80° C. to 140° C., and an outlet having a temperature ranging from about 120° C. to about 140° C.

10. The method of claim 6 wherein the compaction device is operated to provide residence time of the biomass as it passes through the die modified to comprise the opening with the residence time ranging from about 5 seconds to about 15 seconds.

11. The method of claim 8 wherein the cuber is operated to provide a biomass residence time ranging from about 5 seconds to about 15 seconds as it passes through the die modified to comprise the opening.

12. The method of claim 6 wherein curing comprises passing collected compacted torrefied biomass through an oven set at a temperature of from about 80° C. to about 150° C. and is heated in the oven for less than about 5 minutes.

13. The method of claim 12 wherein the oven is selected from a convection oven, a radiant oven, or a microwave oven.

14. The method of claim 13 wherein the compacted torrefied biomass is heated in the microwave oven for about 10 second to about 30 seconds.

15. A system, comprising:
- a first stabilizer/conditioner component configured to receive a torrefied biomass feedstock and apply a liquid to the torrefied biomass;
- a compaction device configured to receive the torrefied biomass feedstock from the first stabilizer/conditioner and capable of compacting torrefied biomass to have a mass density greater than that of the torrefied biomass feedstock, wherein the compaction device comprises at least one die modified to comprise an opening defining an inlet and an outlet, and wherein the inlet is configured to have a temperature of about 80° C. to about 140° C.; and
- a second stabilizer/conditioner component configured to receive the compacted torrefied biomass and thermally cure the compacted torrefied biomass.

16. The system of claim 15 wherein the first stabilizer/conditioner component comprises a milling component and a sieving component.

17. The system of claim 15 wherein the second stabilizer/conditioner component is a conveyor oven selected from a convection oven, a radiant oven, or a microwave oven.

* * * * *